Aug. 23, 1932.      F. M. GOLON              1,873,576
                   DIRECTION INDICATOR
                Filed Dec. 16, 1931    2 Sheets-Sheet 1
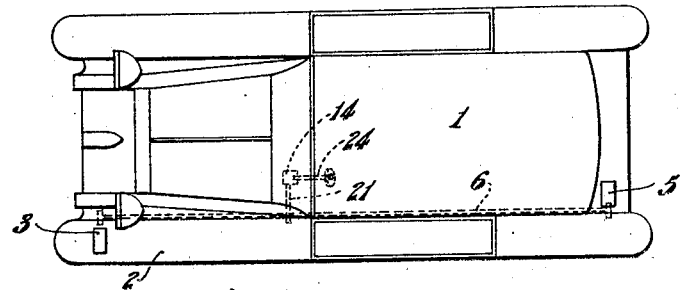
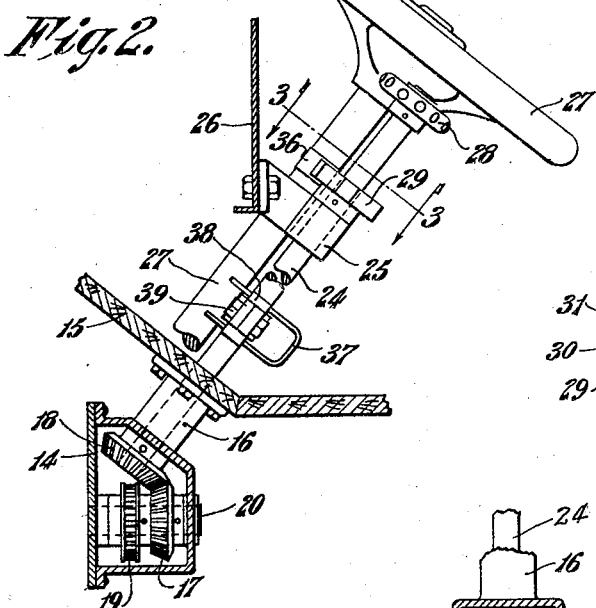
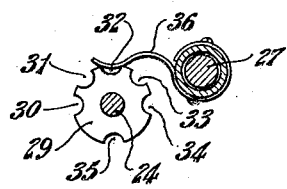
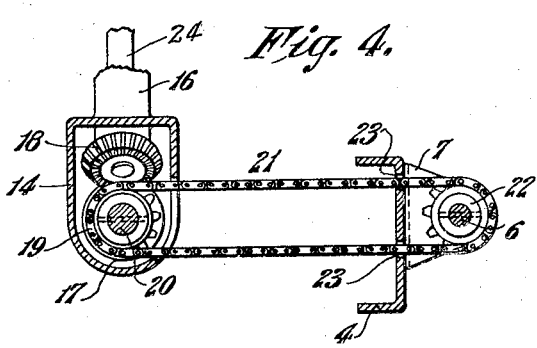
INVENTOR,
Frank M. Golon,
BY
Harry W. Bowen
ATTORNEY.

Aug. 23, 1932.　　　　F. M. GOLON　　　　1,873,576
DIRECTION INDICATOR
Filed Dec. 16, 1931　　　2 Sheets-Sheet 2
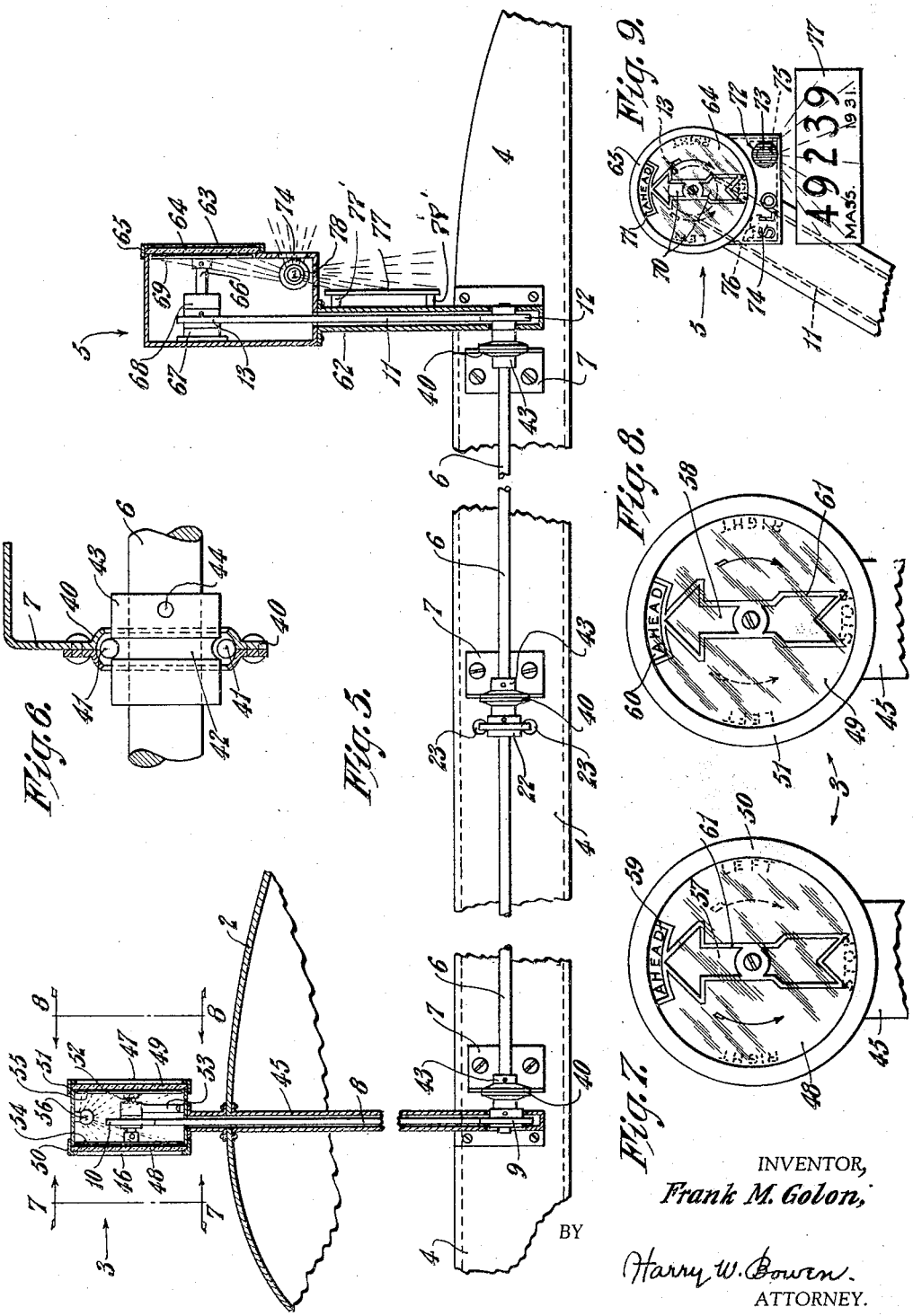
INVENTOR,
Frank M. Golon,
BY
Harry W. Bowen.
ATTORNEY.

Patented Aug. 23, 1932

1,873,576

UNITED STATES PATENT OFFICE

FRANK M. GOLON, OF SPRINGFIELD, MASSACHUSETTS

DIRECTION INDICATOR

Application filed December 16, 1931. Serial No. 581,287.

My invention relates to improvements in direction indicators, and more particularly to that type of direction indicator intended for use on motor vehicles.

An object of my invention is to provide a simple, sturdy, practical device for indicating to any one in front of or behind a motor vehicle the direction in which the driver of the vehicle intends to proceed, such as forward, a turn in either direction, or stop.

A further object of my invention is to provide an operative or controlling means for my direction indicator independent of the steering mechanism of the motor vehicle. Devices are now in use and on the market which are operated by the steering mechanism, but these devices are impractical for several reasons. They do not operate until the vehicle begins to turn, which is too late to give sufficient warning or notice to an approaching or following car. Furthermore, they are inoperative when the motor vehicle is at a standstill, and, therefore, it is impossible to indicate to a traffic officer the direction desired.

A still further object of my invention is to provide a direction indicator which will indicate directions other than, and in addition to, right angles, as many streets intersect at other than right angles, and confusion is avoided by providing my indicator with means for indicating these "halfway" angles or positions.

Broadly, my invention comprises a front indicator member, a rear indicator member, operable connecting means between these members, a manually operated control post, connecting means between the control post and the indicator connecting means, and means on the control post for holding the post in any one of the direction positions.

A preferred embodiment of my invention is illustrated in the accompanying drawings, in which:

Fig. 1 is a plan view of a motor vehicle showing the relative positions of the direction indicator boxes and their operating means.

Fig. 2 is a detail view, partially in section, of the control post, and holding means.

Fig. 3 is a detail plan sectional view on the line 3—3 of Fig. 2, looking in the direction of the arrows.

Fig. 4 is a detail view of the operable connecting means between the control post and the indicator shaft.

Fig. 5 is a detail view illustrating the front and rear indicator boxes, the indicator shaft, and the connecting means between the shaft and the boxes.

Fig. 6 is a typical sectional view of one of the shaft bearings.

Fig. 7 is a front elevational view of the front direction indicator box.

Fig. 8 is a rear elevational view of the front direction indicator box, and

Fig. 9 is an elevational view of the rear direction indicator box.

Referring now to the drawings in detail, in which like numerals refer to like parts throughout:

The motor vehicle 1 has secured to the left front fender 2 the front indicator box 3, and to the frame 4 of the motor vehicle 1 at the left rear the rear indicator box 5. It will be understood that whereas I have shown these approximate positions for the indicator boxes, the flexibility of the connections between the boxes and the shaft will permit the boxes to be placed in other positions on the motor vehicle 1, if so desired.

The shaft 6 is secured to the frame 4 by means of the bearing brackets 7, and the front indicator is operably connected to the shaft 6 by the belt 8 and pulleys 9 and 10, and the rear indicator is operably connected to the shaft 6 by the belt 11 and pulleys 12 and 13. The gear box 14 is secured to the floor board 15 of the motor vehicle 1 by means of the flanged hub 16, and has secured therein the gears 17 and 18 and the sprocket 19. The gear 17 and sprocket 19 are mounted on the shaft 20, and the sprocket 19 is connected to the shaft 6 by means of the chain 21 and sprocket 22. (See Fig. 4.) The chain 21 passes through openings 23 formed in the frame 4. The control post 24 is secured to the gear 18 and revolvably supported in the hub 16 and the bracket 25 which is secured to the dash 26 of the motor vehicle 1. The control post 24 is conveniently located near the steering post 27, and has secured at its upper end the operating wheel 28. The holding collar 29 is secured to the post 24, and is formed with the notches or recesses 30, 31, 32, 33, 34, and 35, so located around the periphery of the collar 29 as to correspond with the directions shown by the indicator arrows, namely, left, left oblique, forward, right oblique, right, and stop, respectively. The spring 36, secured to the steering post 27, retains the post 24 in the desired position, until the post 24 is manually revolved by turning of the wheel 28. The control post 24 may also be operated by action of the driver's foot or knee on the lever 37. The lever 37 is frictionally secured in the bracket 38 which is in turn clamped to the post 24 by means of the screws 39. The lever 37 may be pushed into or pulled out of the bracket 38, and the bracket 38 may be raised or lowered on the post 24 to suit the convenience of individual drivers.

The shaft 6 is secured to the frame 4 of the vehicle 1 by the bearing brackets 7. The bearing brackets 7 are formed with the ball race 40, see Fig. 6, in which are secured a plurality of balls 41 which are engaged in the groove 42 formed in the bearing sleeve 43. The sleeve 43 is loosely fitted in the bracket 7 to compensate for any weaving or warping of the frame 4, due to driving conditions. The bearing sleeve 43 is secured to the shaft 6 by the pin 44.

The belt 8 is protected from the weather by the enclosing casing 45, which is secured to the frame 4 and to the fender 2, as indicated in Fig. 5. The front indicator box 3 is formed with the openings 46 and 47, in which are secured the glass panes 48 and 49 by the end rings 50 and 51. The pulley 10 is secured on the shaft 52 which is revolvably secured in the bearing bracket 53. Metal discs 54 and 55 are secured to the shaft 52 just inside of the glass panes 48 and 49, respectively. The lamp bulb 56 is secured to the inside of the box 3 and electrically connected to the usual lighting system of the motor vehicle, not shown. The glass pane 48 is lettered with the words "Right", "Ahead", "Left", and "Stop", as indicated in Fig. 7, and the glass pane 49 is lettered with the respective words "Left", "Ahead", "Right", and "Stop", as indicated in Fig. 8. The metal discs 54 and 55 are formed with the arrow-shaped openings 57 and 58 and the segmental notches 59 and 60, respectively. The positions of the left oblique and right oblique are indicated by the arrow-shaped openings only. The openings 57 and 58 are outlined in white enamel 61, for daylight use. The rear indicator box 5 is constructed in a similar manner. The belt 11 is enclosed in the metal casing 62 which is secured to the frame 4 and which supports the box 5. The box 5 is formed with the opening 63 in which is secured the glass pane 64 by the ring 65. The pulley 13 is secured on the shaft 66 which is revolvably secured in the bearings 67 and 68. The metal disc 69, formed with the arrow-shaped opening 70 and the segmental notch 71, is secured to the shaft 66 back of the glass 64. The glass pane 64 is lettered in a similar manner to the glass pane 49. The box 5 extends downwardly below the ring 65, and is formed with the opening 72, in which is secured the red glass 73 and the openings 74 which form the letters Slo. Lamps 75 and 76 are secured within the box 5 back of the openings 72 and 74. The lamp 75 is electrically connected to the usual lighting system, not shown, and serves to illuminate the lens 73, the license plate 77 through the opening 78 in the box 5, and the openings 70 and 71. The lamp 76 is electrically connected to the braking system in the usual manner. The license plate 77 is secured to bars 77' in the usual manner, and the bars 77' are secured to the casing 62 in any suitable manner.

When operated at night, the lamps 56 and 75 shine through the arrow-shaped openings 57, 58, and 70, and the segmental openings 59, 60 and 71, thus indicating the direction in which the driver intends to guide the vehicle. The metal discs 54, 55, and 69 obstruct the light, except that which passes through these openings, thus concealing all the words on the glass panes 48, 49, and 64, except those which register with the openings 59, 60 and 71. The arrow 57 is visible from the front of the vehicle, the arrow 58 is visible to the driver, and the arrow 70 is visible to the rear of the vehicle. In daylight, the enamel outlining of the arrows and the notches in the metal discs 54, 55 and 69 serve the same purpose as the lamps at night.

In operation, the operator, by manipulation of the handle 28 or the lever 37, actuates the control rod 24 which, by means of the gears 17 and 18, sprockets 19 and 22, chain 21, shaft 6, pulleys 9, 10, 12, and 13, and belts 8 and 11, moves the discs 54, 55, and 69 to the position desired. This position is maintained by engagement of the spring 36 in the proper notch in the collar 29 until the control rod is again manipulated by the driver.

What I claim is:

1. A direction indicator comprising, in combination with a motor vehicle, a longitudinally extending shaft, ball bearing means for rotatably supporting the shaft, direction indicators located at the forward and rearward end of the vehicle, operative connections between the shaft and each of the direction indicators, means for operating the shaft and for retaining the shaft and indicators in different adjustable positions comprising a second shaft located adjacent the steering wheel of the vehicle and operably connected to the longitudinally extending shaft, a notched member on the second shaft, and a spring device engaging the notches, as described.

2. A direction indicator comprising a casing the opposite ends of which are closed with transparent material, a source of light, a shaft rotatably mounted within the casing, a disc on each of the opposite ends of the shaft and formed with a cutout portion in the shape of an arrow, means for rotating the shaft for placing the arrows in different positions, said casing having words thereon indicating the direction the vehicle is to proceed, and each disc being shaped to bar the light from all of the words, except the one that is readable to indicate the desired direction by the arrow.

3. A tail light for a motor vehicle comprising a casing, a rotatable shaft therein, a disc secured to the shaft with a cutout opening in the shape of an arrow, means for illuminating the interior of the casing to display the arrow, the casing having an extension portion to show a stop light, means for attaching a number plate below the casing, in position to be illuminated from the interior thereof through an opening formed in the bottom of the casing.

4. A traffic signal device for motor vehicles comprising a casing having its opposite ends closed with transparent material, and direction words on the transparent material, a rotatable shaft in the casing, discs on the shaft formed each with a cutout portion shaped to indicate an arrow, each disc having its edge formed with a cutout portion positioned to register with only the direction word adjacent to the end of its arrow, means for illuminating the casing, and means for operating the rotatable shaft from the driver's seat.

5. A traffic signal device for motor vehicles comprising a casing having its opposite ends closed with transparent material, and direction words on the transparent material, a rotatable shaft in the casing, discs on the shaft formed each with a cutout portion to indicate an arrow, each disc having its edge formed with a cutout portion registering only with the direction word adjacent the end of its arrow, means for illuminating the casing, and means for operating the rotatable shaft from the driver's seat, said means comprising a shaft rotatably mounted on the motor vehicle, connecting means between the two shafts, and means for adjustably positioning the shafts and discs for indicating different positions of the arrows.

6. In a direction indicating and signal device for motor vehicles, a shaft attached to the vehicle, direction indicating devices at the opposite ends of the vehicle, means for operating the devices from the shaft, means for retaining the indicating devices at several intermediate positions other than at right angular positions, comprising a second shaft operatively connected to the first named shaft, a notched disc on the second shaft, a spring engaging the notches of the disc, and adjustable means on the disc-supporting shaft for operating the same with the leg of the operator.

FRANK M. GOLON.